United States Patent
Rosario

(10) Patent No.: US 7,347,441 B2
(45) Date of Patent: Mar. 25, 2008

(54) TOWING ACCESSORY SYSTEM

(76) Inventor: Israel Rosario, P.O. Box 834088, West Hollywood, FL (US) 33083

( * ) Notice: Subject to any disclaimer, the term of this patent is extended or adjusted under 35 U.S.C. 154(b) by 93 days.

(21) Appl. No.: 11/129,808

(22) Filed: May 16, 2005

(65) Prior Publication Data
US 2006/0186639 A1    Aug. 24, 2006

Related U.S. Application Data

(63) Continuation-in-part of application No. 11/061,210, filed on Feb. 18, 2005.

(51) Int. Cl.
*B60D 1/06* (2006.01)
(52) U.S. Cl. .................................... 280/507
(58) Field of Classification Search ............ 280/507, 280/511, 504
See application file for complete search history.

(56) References Cited

U.S. PATENT DOCUMENTS

| | | | |
|---|---|---|---|
| 4,208,065 A * | 6/1980 | Hansen | 280/507 |
| 4,248,451 A | 2/1981 | Usinge | |
| 4,291,893 A * | 9/1981 | Hansen | 280/507 |
| 5,087,064 A * | 2/1992 | Guhlin | 280/507 |
| 5,934,698 A | 8/1999 | Despain | |
| 6,406,052 B1 * | 6/2002 | Bale | 280/507 |
| 6,543,260 B2 * | 4/2003 | Koy et al. | 70/34 |
| 6,644,071 B2 | 11/2003 | Gilbertson | |
| 6,932,376 B1 * | 8/2005 | Profitt | 280/507 |
| 6,969,085 B2 * | 11/2005 | Causey, Jr. | 280/507 |

* cited by examiner

*Primary Examiner*—Tony Winner
(74) *Attorney, Agent, or Firm*—Edward P. Dutkiewicz, P.A.

(57) ABSTRACT

A receptacle has a recess and a passageway. A ball extends upwardly for receiving thereon a hitch. The ball is secured with respect to a coupling plate. A projection is received within the recess. The projection has a passageway with a pin. A locking assembly has a fixed portion. The fixed portion has a sleeve. The sleeve is secured with respect to the coupling plate. A passageway extends through the coupling plate. A removable portion has a retaining bar. The removable portion has a portion adapted to be removably coupled with respect to the sleeve with a passageway and a pin.

1 Claim, 9 Drawing Sheets

TOWING ACCESSORY SYSTEM

RELATED APPLICATION

The present application is a continuation-in-part of pending U.S. patent application Ser. No. 11/061,210 filed Feb. 18, 2005, the subject matter of which is incorporated herein by reference.

BACKGROUND OF THE INVENTION

1. Field of the Invention

The present invention relates to a towing accessory system and more particularly pertains to coupling a trailer to a vehicle at any of a plurality of elevations and with locking capabilities.

2. Description of the Prior Art

The use of hitch assemblies of known designs and configurations is known in the prior art. More specifically, hitch assemblies of known designs and configurations previously devised and utilized for the purpose of coupling a trailer to a vehicle through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,644,071 issued Nov. 11, 2003 to Gilbertson relates to a trailer locking system. U.S. Pat. No. 5,934,698 issued Aug. 10, 1999 to Despain relates to an adjustable hitch support. Lastly, U.S. Pat. No. 4,248,451 issued Feb. 3, 1981 to Usinge relates to a hitch assembly.

While these devices fulfill their respective, particular objectives and requirements, the aforementioned patents do not describe towing accessory system that allows coupling a trailer to a vehicle at any of a plurality of elevations and with locking capabilities.

In this respect, the towing accessory system according to the present invention substantially departs from the conventional concepts and designs of the prior art, and in doing so provides an apparatus primarily developed for the purpose of coupling a trailer to a vehicle at any of a plurality of elevations and with locking capabilities.

Therefore, it can be appreciated that there exists a continuing need for a new and improved towing accessory system which can be used for coupling a trailer to a vehicle at any of a plurality of elevations and with locking capabilities. In this regard, the present invention substantially fulfills this need.

SUMMARY OF THE INVENTION

In view of the foregoing disadvantages inherent in the known types of hitch assemblies of known designs and configurations now present in the prior art, the present invention provides an improved towing accessory system. As such, the general purpose of the present invention, which will be described subsequently in greater detail, is to provide a new and improved towing accessory system and method which has all the advantages of the prior art and none of the disadvantages.

To attain this, the present invention essentially comprises a receptacle. The receptacle is adapted to extend rearwardly from a rear of a vehicle. The receptacle has a rectangular cross section. The receptacle has a horizontally disposed recess. A laterally extending passageway is provided. The passageway extends through the recess.

A ball is provided. The ball extends upwardly in a generally spherical configuration. A hitch is provided. The ball receives the hitch. The hitch is adapted to be towed by a vehicle.

Provided next is a coupling plate. The coupling plate has an upper surface and a lower surface. The coupling plate has a front end and a rear end. An obtuse angle bend is provided between the front and rear end. The coupling plate has an aperture. The aperture is provided through the coupling plate and adjacent to the rear end. The ball is secured over the upper surface at the aperture. The coupling plate has a horizontally disposed projection. The horizontally disposed projection has a rectangular configuration. The projection extends rearwardly from the lower surface adjacent to the front end. The projection is receivable within the recess of the receptacle. The projection has a lateral extending passageway. The lateral extending passageway is aligned with the passageway of the receptacle during operation and use. A pin is provided. The pin couples the ball and the receptacle.

Further provided is a locking assembly. The locking assembly has a fixed portion and a removable portion. The fixed portion includes a sleeve. The sleeve has a rectangular configuration. The sleeve is secured to the upper surface of the coupling plate adjacent to the front end. The sleeve has a plurality of passageways. The passageway extends laterally through the sleeve at different elevations. The removable portion includes a retaining bar. The retaining bar is positionable over the ball. A portion of the hitch is adapted to be towed. The removable portion also includes a block. The block is adapted to be removably received within the sleeve. The removable portion also includes an elbow. The elbow is provided between the retaining bar and the block. The removable portion has a laterally extending passageway. The removable portion has a pin. The pin extends through the passageway of the elbow and one of the passageways of the sleeve. In this manner varying the distance between the ball and the retaining bar is allowed.

Provided last is a U-shaped coupler. One leg is the pin extending through the passageways of the receptacle and the projection. The other leg is the pin extending through the passageways of the sleeve and the elbow. The coupler also includes a cotter pin. The cotter pin extends through one of the legs of the coupler.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved towing accessory system which has all of the advantages of the prior art hitch assemblies of known designs and configurations and none of the disadvantages.

It is another object of the present invention to provide a new and improved towing accessory system which may be easily and efficiently manufactured and marketed.

It is further object of the present invention to provide a new and improved towing accessory system which is of durable and reliable constructions.

An even further object of the present invention is to provide a new and improved towing accessory system which is susceptible of a low cost of manufacture with regard to both materials and labor, and which accordingly is then susceptible of low prices of sale to the consuming public, thereby making such towing accessory system economically available to the buying public.

Even still another object of the present invention is to provide a towing accessory system for coupling a trailer to a vehicle at any of a plurality of elevations and with locking capabilities.

Lastly, it is an object of the present invention to provide a new and improved towing accessory system. A receptacle has a recess and a passageway. A ball extends upwardly for receiving thereon a hitch. The ball is secured to the coupling plate. A projection is received within the recess. The projection has a passageway with a pin. A locking assembly has a fixed portion. The fixed portion has a sleeve. The sleeve is coupled with respect to the coupling plate. A passageway extends through the coupling plate. A removable portion has a retaining bar. The removable portion has a supplemental portion adapted to be removably coupled with respect to the sleeve with a passageway and a pin.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the primary preferred embodiment of the present invention and a plurality of alternate embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
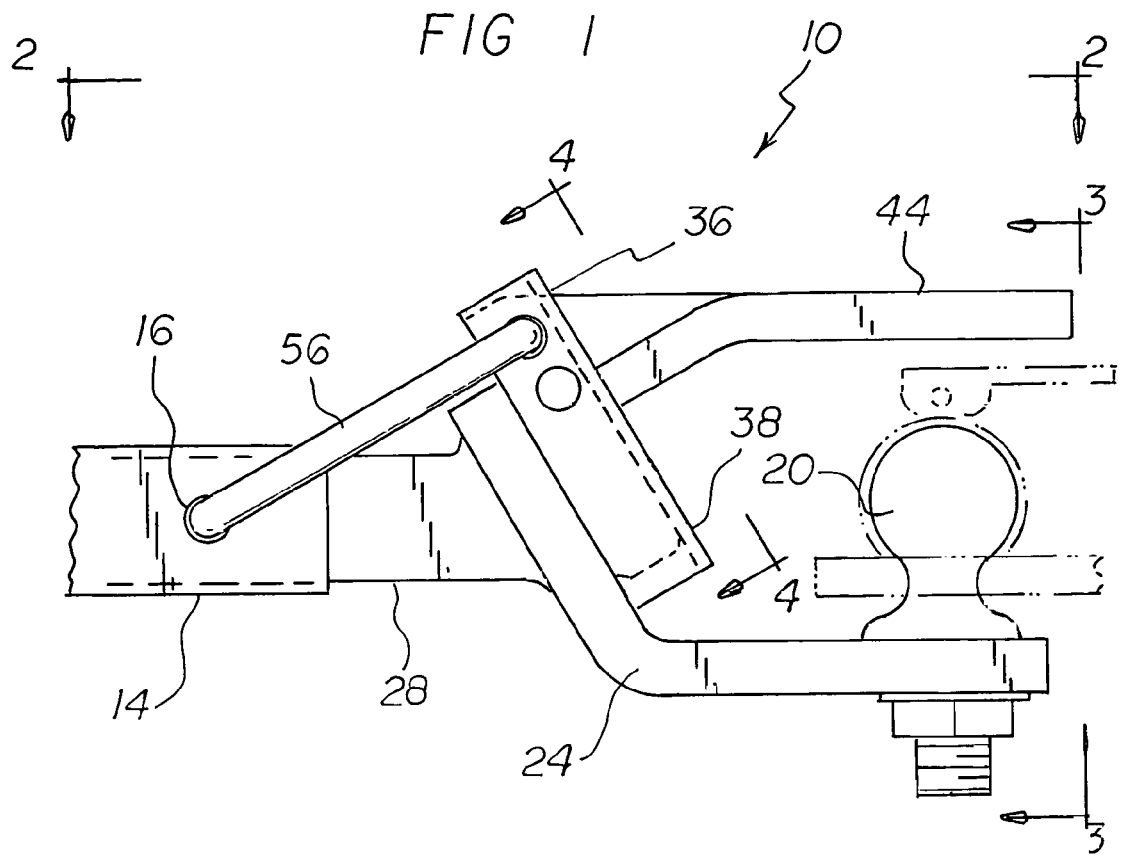
FIG. 1 is a side elevational view of a towing accessory system constructed in accordance with the principles of the preset invention.
Figure 2:
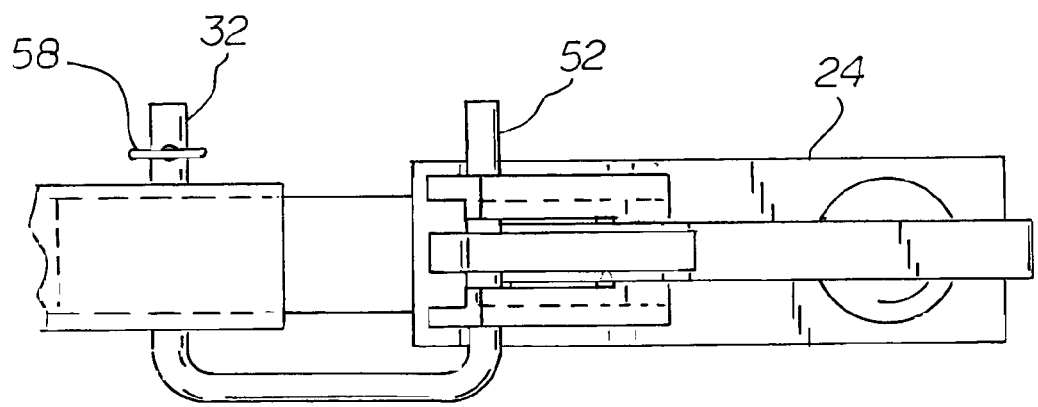
FIG. 2 is a plan view of the system taken along line 2-2 of FIG. 1.
Figure 3:
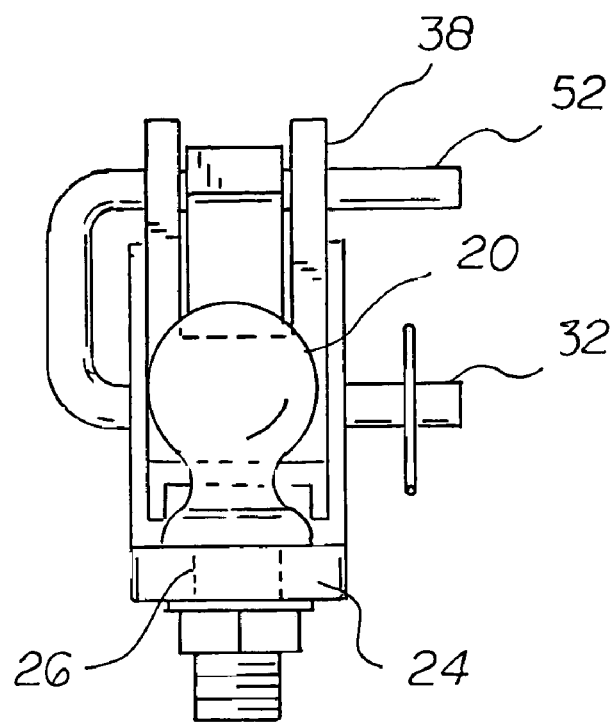
FIG. 3 is a rear elevational view taken along line 3-3 of FIG.
Figure 4:
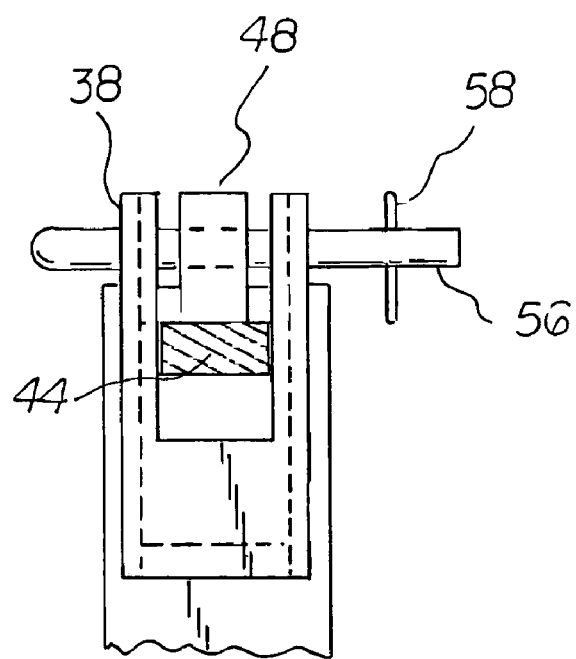
FIG. 4 is a cross sectional view taken along line 4-4 of FIG. 1.
Figure 5:
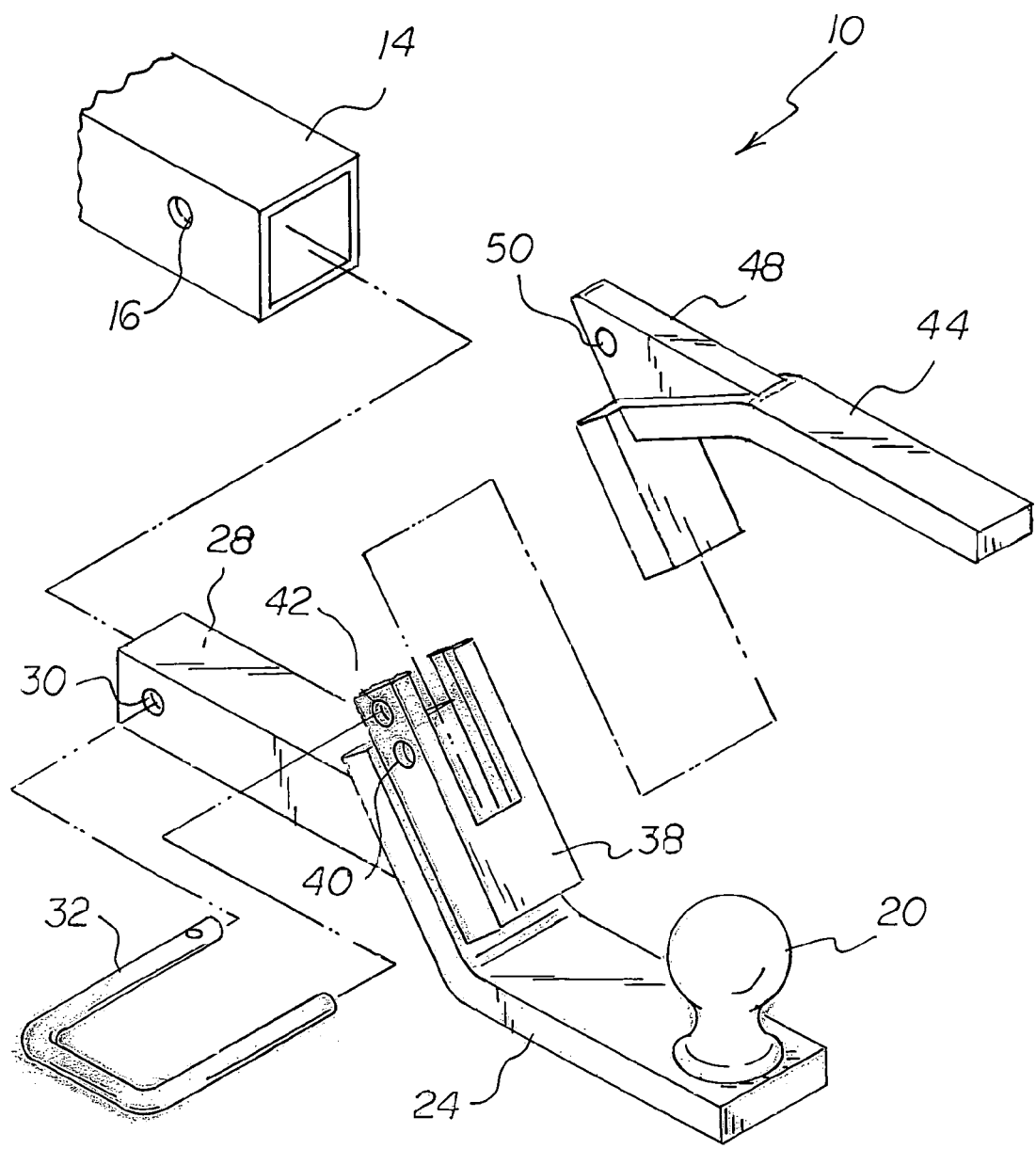
FIG. 5 is an exploded perspective illustration of the system.

With reference now to the drawings, and in particular to FIG. 1 thereof, the preferred embodiment of the new and improved towing accessory system embodying the principles and concepts of the present invention and generally designated by the reference numeral 10 will be described.

The present invention, the towing accessory system 10 is comprised of a plurality of components. Such components in their broadest context include a receptacle, a ball, a coupling plate and a locking assembly. Such components are individually configured and correlated with respect to each other so as to attain the desired objective.

First provided is a receptacle 14. The receptacle is adapted to extend rearwardly from a rear of a vehicle. The receptacle has a rectangular cross section. The receptacle has a horizontally disposed recess. A laterally extending passageway 16 is provided. The passageway extends through the recess.

A ball 20 is provided. The ball extends upwardly in a generally spherical configuration. A hitch is provided. The ball receives the hitch. The hitch is adapted to be towed by a vehicle.

Provided next is a coupling plate 24. The coupling plate has an upper surface and a lower surface. The coupling plate has a front end and a rear end. An obtuse angle bend is provided between the front and rear end. The coupling plate has an aperture 26. The aperture is provided through the coupling plate and adjacent to the rear end. The ball is secured over the upper surface at the aperture. The coupling plate has a horizontally disposed projection 28. The horizontally disposed projection has a rectangular configuration. The projection extends rearwardly from the lower surface adjacent to the front end. The projection is receivable within the recess of the receptacle. The projection has a lateral extending passageway 30. The lateral extending passageway is aligned with the passageway of the receptacle during operation and use. A pin 32 is provided. The pin couples the ball and the receptacle.

Further provided is a locking assembly 36. The locking assembly has a fixed portion and a removable portion. The fixed portion includes a sleeve 38. The sleeve has a rectangular configuration. The sleeve is secured to the upper surface of the coupling plate adjacent to the front end. The sleeve has a plurality of passageways 40, 42. The passageway extends laterally through the sleeve at different elevations. The removable portion includes a retaining bar 44. The retaining bar is positionable over the ball. The hitch is adapted to be towed. The removable portion also includes a supplemental portion which in the preferred embodiment of the invention is a block 46. The block is adapted to be removably received within the sleeve. The removable portion also includes an elbow 48. The elbow is provided between the retaining bar and the block. The removable portion has a laterally extending passageway 50. The removable portion has a pin 52. The pin extends through the passageway of the elbow and one of the passageways of the sleeve. In this manner varying the distance between the ball and the retaining bar is allowed.

Provided last is a U-shaped coupler 56. One leg is the pin extending through the passageways of the receptacle and the projection. The other leg is the pin extending through the passageways of the sleeve and the elbow. The coupler also includes a cotter pin 58. The cotter pin extends through one of the legs of the coupler.

Figure 6:
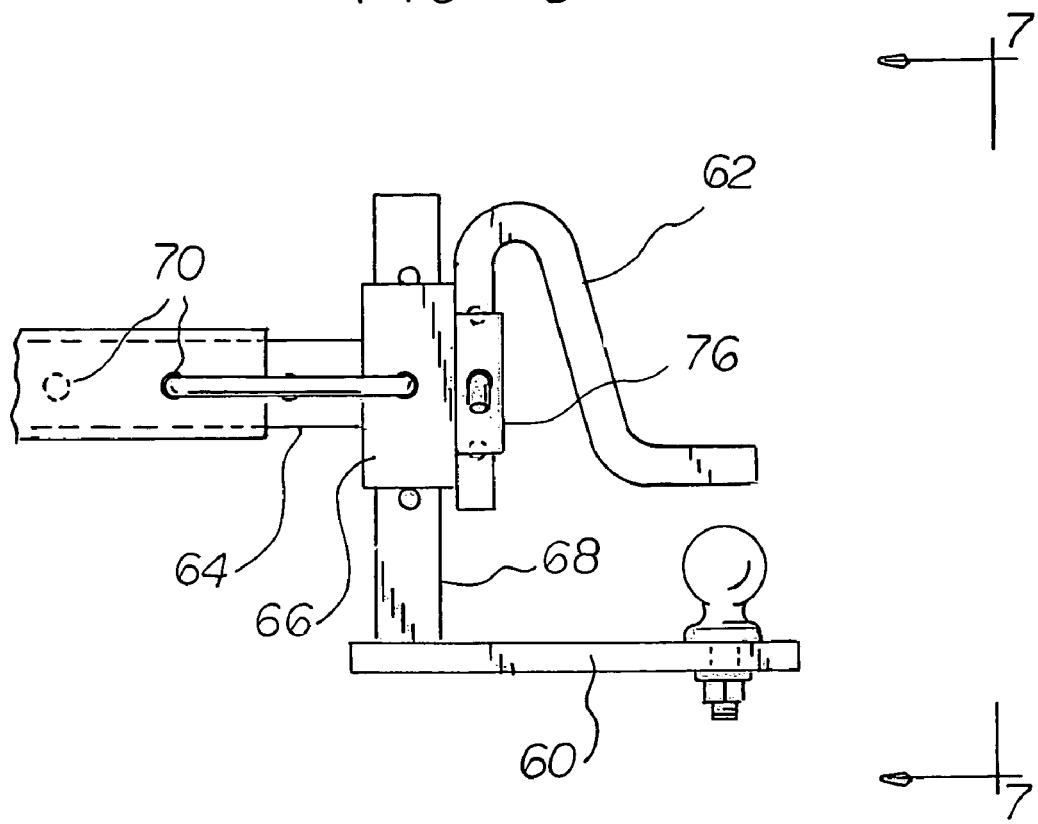
FIG. 6 is a side elevational view of a first alternate embodiment of the invention.
Figure 7:
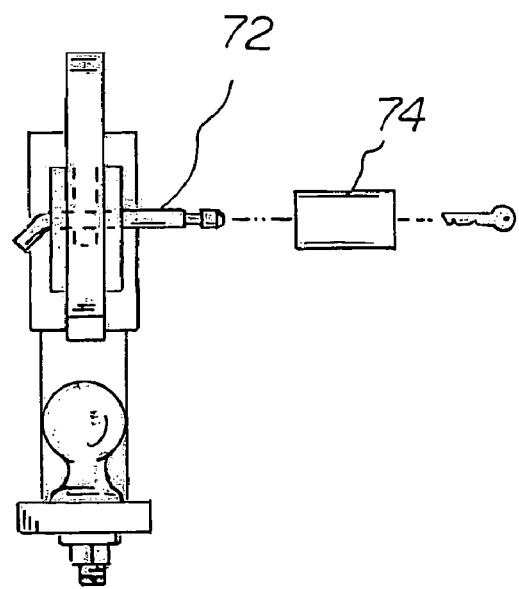
FIG. 7 is a rear elevational view taken along line 7-7 of FIG. 6.

FIGS. 6 and 7 illustrate an alternate embodiment of the invention. In an alternate embodiment of the present invention, a linear coupling plate 60 and serpentine shaped retaining barn 62 are provided. The coupling plate has an upper surface and a lower surface. The coupling plate has a front end and a rear end. The coupling plate has an aperture. The aperture is provided through the coupling plate. The aperture is adjacent to the rear end. The ball is secured over the upper surface at the aperture. The coupling plate has a horizontally disposed projection 64. The projection has a rectangular configuration. A slider is provided 66. The projection extends rearwardly from the plate through the slider. A post is provided 68. The projection is adjustably received on the post. The post extends upwardly from adjacent to the front end of the receptacle. The projection has a plurality of lateral extending passageways 70. The passageways are alignable with the passageway of the receptacle during operation and use. A pin 72 and a lock 74 are provided. A sleeve 76 is provided and is secured to the slider 66. The pin and lock adjustably couple the retaining bar 62 to the slider through the sleeve. In this manner the ball and the receptacle are adjustably coupled.

Figure 8:
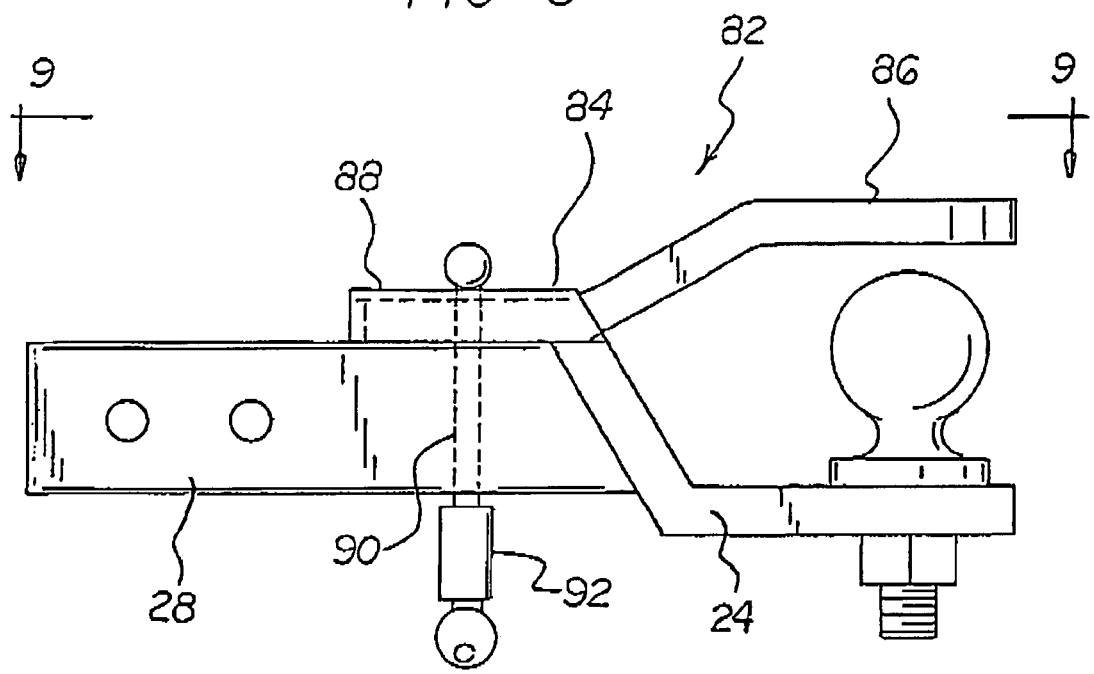
FIGS. 8 and 9 are a side elevational view and a plan view of a second alternate embodiment of the invention.
Figure 9:
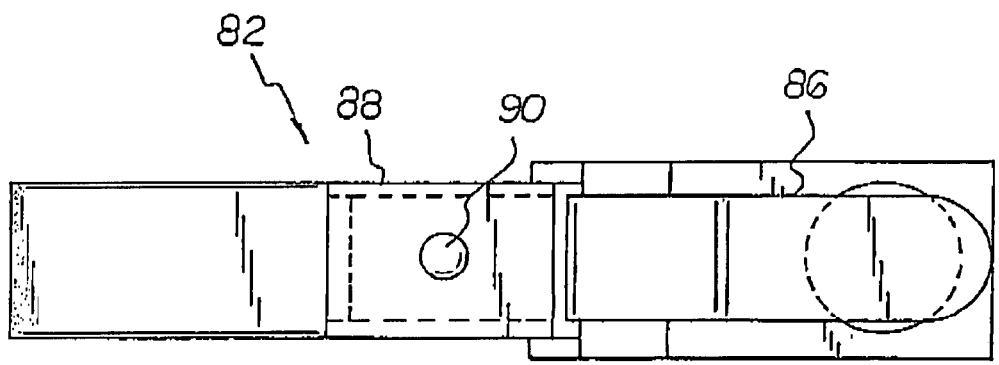

FIGS. 8 and 9 are a side elevational view and a plan view of a second alternate embodiment of the invention. In such embodiment, the system 82 includes a locking assembly 84 which has a retaining bar 86 positionable over the ball. An aperture portion 88 is positioned over the projection with a pin 90 removably positionable through the aperture portion and the projection. A lock 92 with a key is provided at one end of the pin. A combination lock may be utilized as an alternative for the lock with a key.

Figure 10:
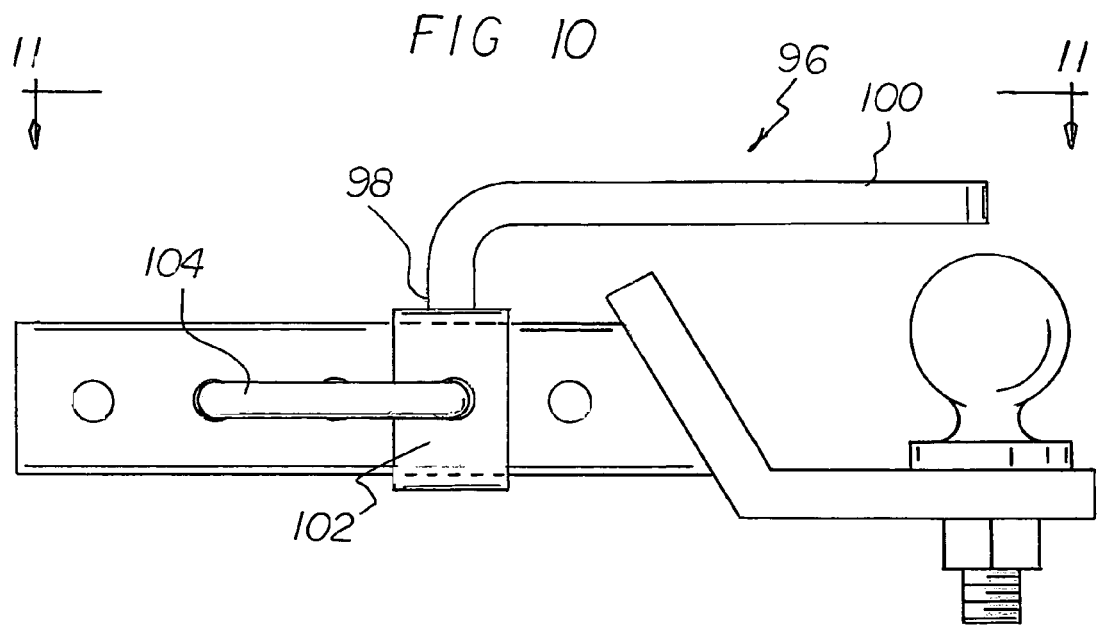
FIGS. 10 and 11 are a side elevational view and a plan view of a third alternate embodiment of the invention.
Figure 11:
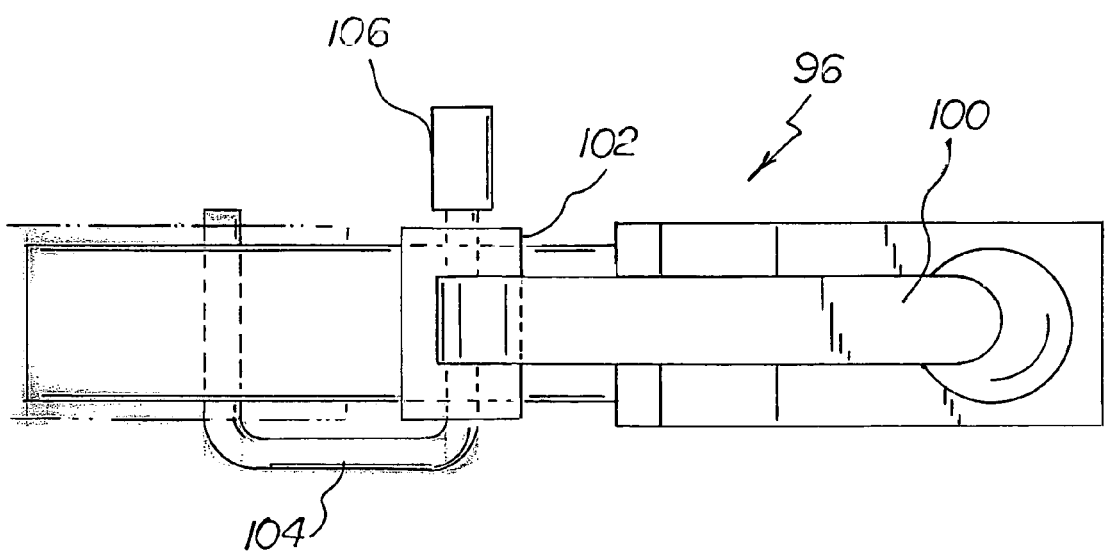

The system 96, as illustrated in FIGS. 10 and 11, is directed to a third alternate embodiment of the invention. In such system, the locking assembly 98 includes a retaining bar 100 positionable over the ball and a sleeve portion 102 positioned around the projection. A U-shaped pin 104 is removably positionable through the sleeve portion and the projection. A lock 106 is provided at one end of the pin.

Figure 12:
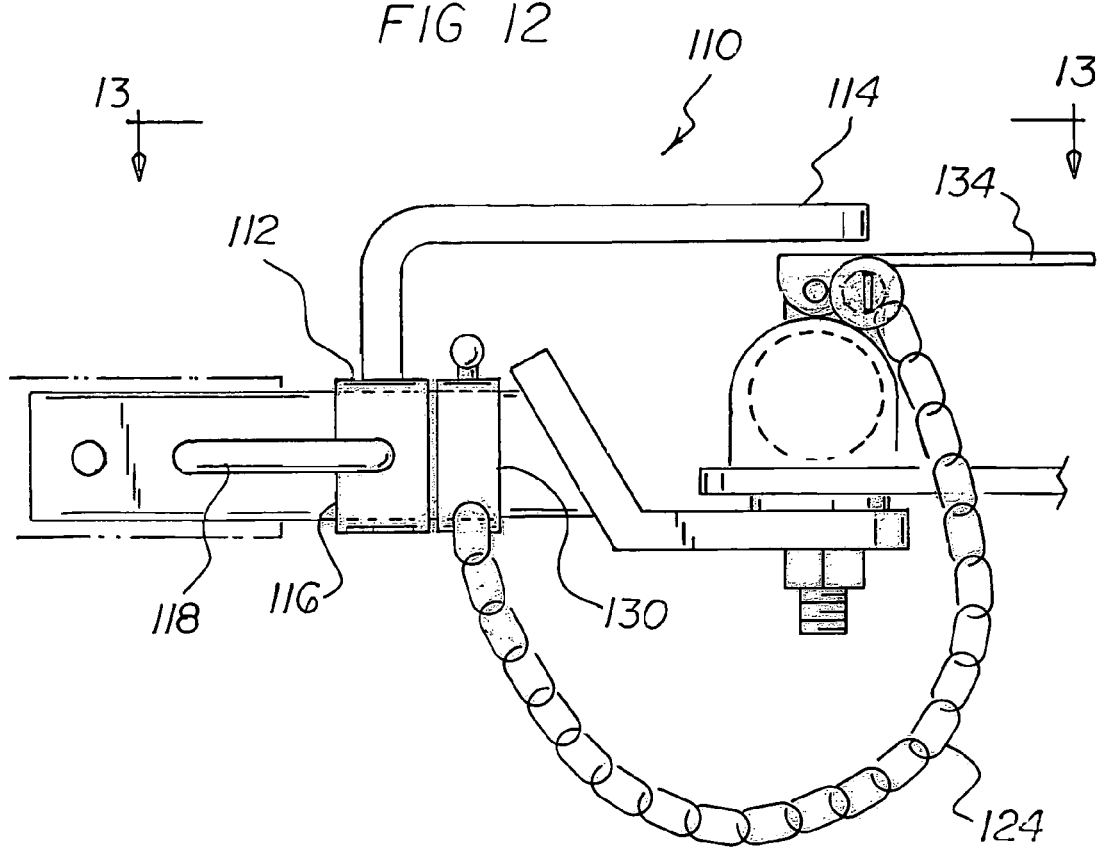
FIGS. 12 and 13 are a side elevational view and a plan view of a fourth alternate embodiment of the invention.
Figure 13:
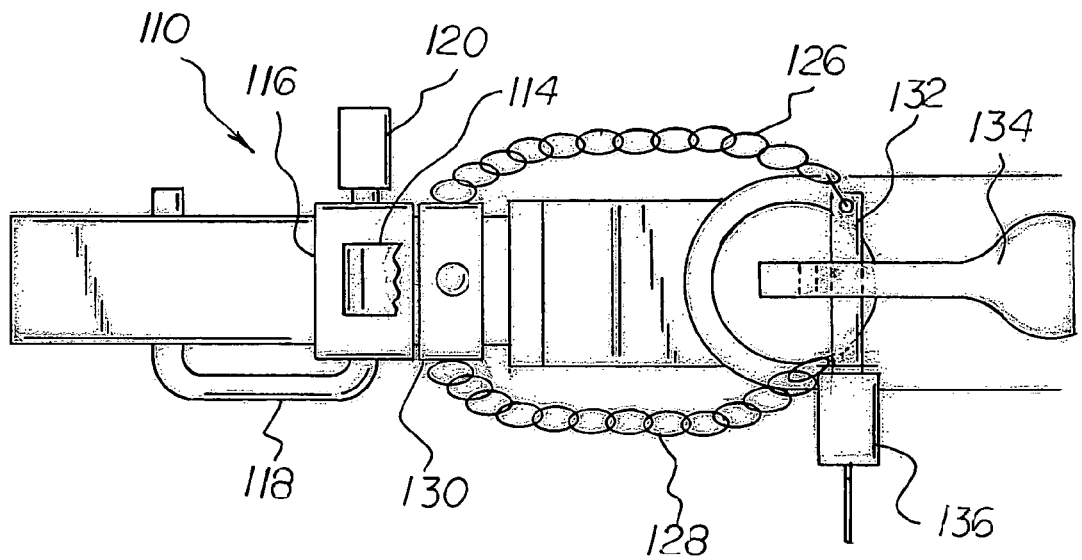

The system 110 is directed to a fourth alternate embodiment of the invention. Note FIGS. 12 and 13. In such embodiment, the locking assembly 112 includes a retaining bar 114 positionable over the ball and a sleeve portion 116 positioned around the projection. A U-shaped pin 118 is removably positionable through the sleeve portion and the projection. A lock 120 is provided at one end of the pin. Further included is a secondary locking assembly 124 having two chains 126 and 128. Each chain has a first end and a second end. A supplemental sleeve 130 is attached to the first ends and a linear pin 132 is attached to the second ends.

The linear pin is adapted to releasebly couple to a ball covering component of a trailer. A lock 136 is provided at one end of the linear pin.

Figure 14:
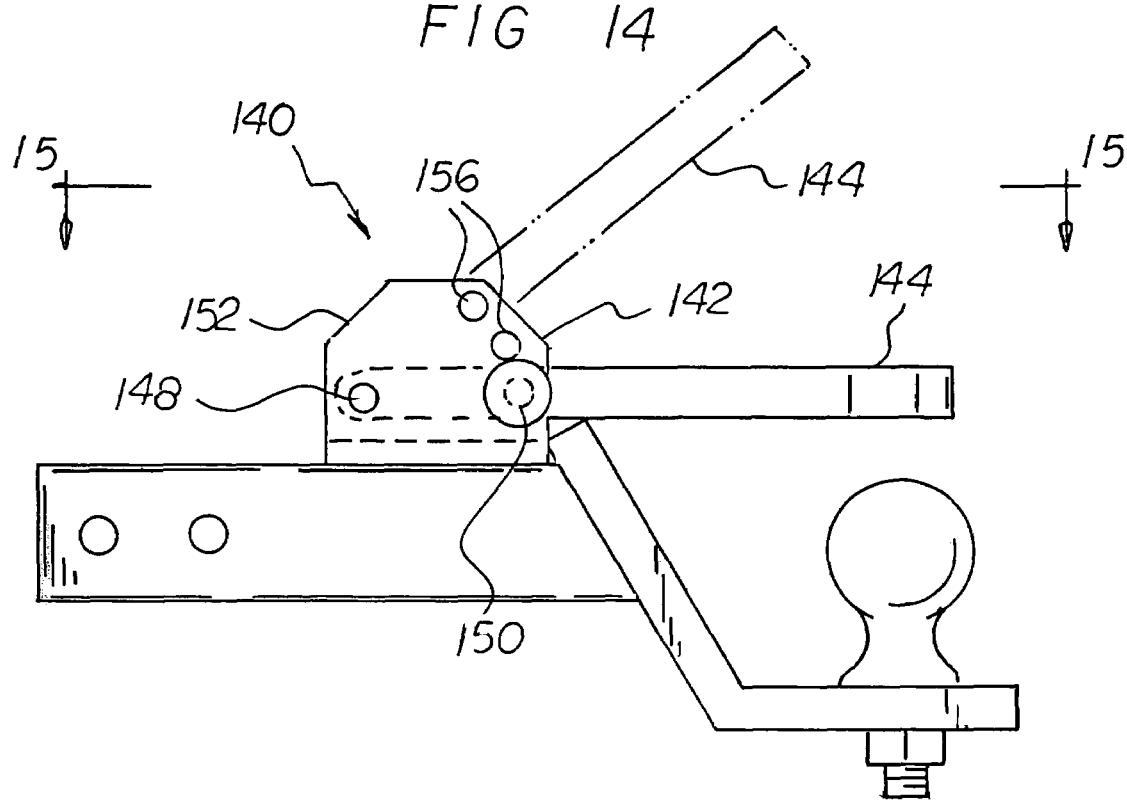
FIGS. 14 and 15 are a side elevational view and a plan view of a fifth alternate embodiment of the invention.
Figure 15:
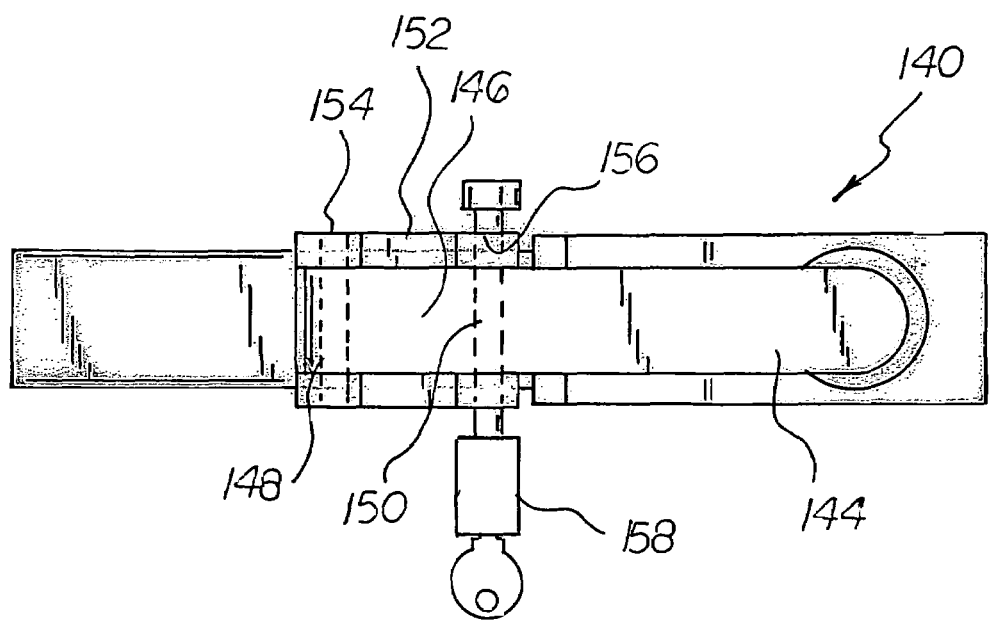
Figure 16:
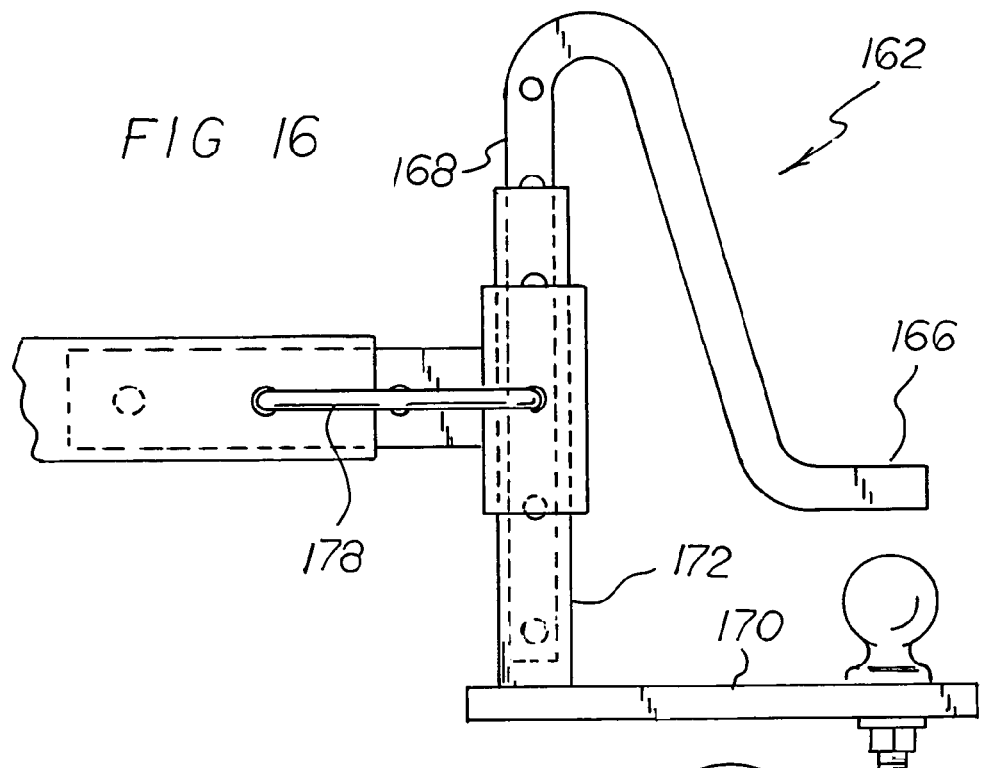
FIGS. 16 and 17 are a side elevational view and an exploded side elevational view of a sixth alternate embodiment of the invention.
Figure 17:
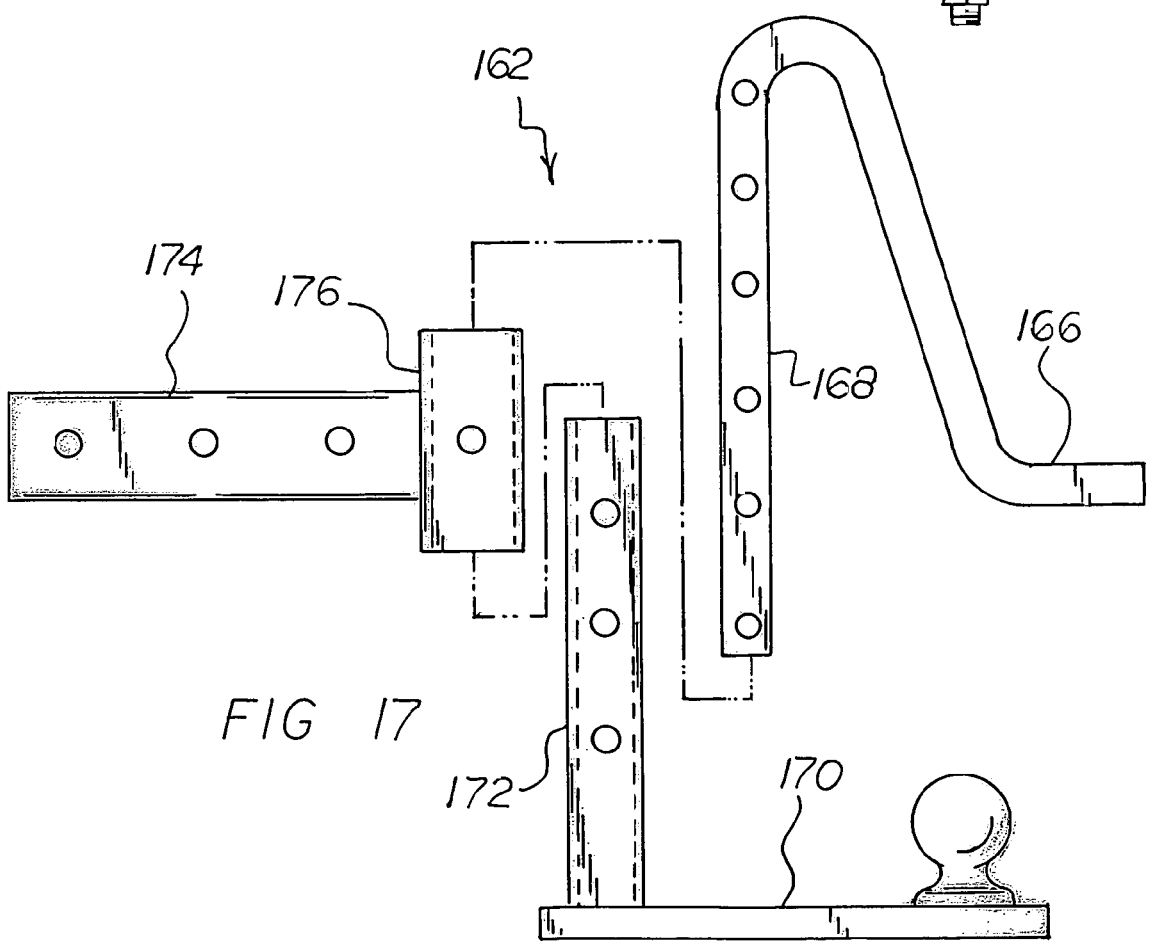

FIGS. 14 and 15 describe a system 140 constituting a fifth alternate embodiment of the invention. In such embodiment, the locking assembly 142 includes a retaining bar 144 positionable over the ball and an aperture portion 146 positioned over the projection. A pivot pin 148 and a locking pin 150 are removably positionable through the aperture portion. The locking assembly also includes a U-shaped bracket 152 attached to the projection with pivot apertures 154 receiving the pivot pin. A plurality of rotationally displaced locking apertures 156 receive the locking pin. A lock 158 is provided at one end of the pin.

Lastly provided is a sixth alternate embodiment of the invention. In the system 162 of such embodiment, the locking assembly 164 includes a retaining bar 166 positionable over the ball and a vertically extending aperture portion 168. The coupling plate 170 has an upstanding aperture intermediate sleeve 172 receiving the aperture portion. The projection 174 has an aperture exterior sleeve 176 receiving the aperture portion and the intermediate sleeve. A pin 178 is removably received through the aperture portion and the intermediate sleeve and the exterior sleeve.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A towing accessory system comprising:
   a receptacle with a recess and with a passageway;
   a ball extending upwardly for receiving thereon a hitch;
   a coupling plate with the ball being secured thereto and with a projection receivable within the recess, the projection having a passageway;
   a locking assembly having a fixed portion including a sleeve, a pin, and a lock wherein the sleeve is secured to the coupling plate with a passageway extending there through;
   a removable portion including an aperture and a retaining bar, the retaining bar positionable over the ball, and wherein the removable portion having a portion adapted to be removably coupled to the sleeve with the aperture positioned over the projection and the pin removably engaged through the aperture and the projection; and
   the lock removably engaged at one end of the pin.

\* \* \* \* \*